US010972156B2

(12) United States Patent
Athley et al.

(10) Patent No.: US 10,972,156 B2
(45) Date of Patent: Apr. 6, 2021

(54) MEASUREMENT REPORTING IN RADIO ACCESS NETWORKS FOR MU-MIMO OPERATION

(71) Applicant: Telefonaktiebolaget LM Ericsson (publ), Stockholm (SE)

(72) Inventors: Fredrik Athley, Kullavik (SE); Sebastian Faxér, Järfälla (SE); Andreas Nilsson, Gothenburg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/619,563

(22) PCT Filed: Jun. 16, 2017

(86) PCT No.: PCT/SE2017/050652
§ 371 (c)(1),
(2) Date: Dec. 5, 2019

(87) PCT Pub. No.: WO2018/231111
PCT Pub. Date: Dec. 20, 2018

(65) Prior Publication Data
US 2020/0127710 A1    Apr. 23, 2020

(51) Int. Cl.
*H04B 7/06* (2006.01)
*H04B 7/0417* (2017.01)
*H04B 7/0452* (2017.01)

(52) U.S. Cl.
CPC ........ *H04B 7/0417* (2013.01); *H04B 7/0452* (2013.01); *H04B 7/0695* (2013.01)

(58) Field of Classification Search
CPC ... H04B 7/0417; H04B 7/0452; H04B 7/0695
USPC .......................................................... 375/267
See application file for complete search history.

(56) References Cited

U.S. PATENT DOCUMENTS

| 2013/0223251 A1* | 8/2013 | Li | H04B 7/0619 370/252 |
| 2013/0279403 A1* | 10/2013 | Takaoka | H04W 72/042 370/328 |
| 2015/0282122 A1 | 10/2015 | Kim | |
| 2016/0285660 A1* | 9/2016 | Frenne | H04B 7/0695 |
| 2018/0367270 A1* | 12/2018 | Raghavan | H04W 72/046 |

OTHER PUBLICATIONS

International Search Report and Written Opinion of the International Searching Authority, PCT/SE2017/050652, dated Feb. 20, 2018, 14 pages.
Yinggang Du et al., "Evaluation of PMI Feedback Schemes for MU-MIMO Pairing", IEEE Systems Journal, vol. 4, No. 4. Dec. 2010, XP11320688A1, pp. 505-510.

* cited by examiner

*Primary Examiner* — Ted M Wang
(74) *Attorney, Agent, or Firm* — Sage Patent Group (57) ABSTRACT

There is disclosed a method of operating an informing radio node in a radio access network. The method comprises transmitting beam reception information, the beam reception information being based on measurements performed on beams of a set of beams. The beam reception information indicates one or more beams of the set of beams to belong to a first subset of the set of beams, the first subset comprising weakly received beams.

The disclosure also pertains to related devices and methods.

21 Claims, 5 Drawing Sheets

MEASUREMENT REPORTING IN RADIO ACCESS NETWORKS FOR MU-MIMO OPERATION

This application is a 35 U.S.C. § 371 national stage application of PCT International Application No. PCT/SE2017/050652 filed on Jun. 16, 2017, the disclosure and content of which is incorporated by reference herein in its entirety.

TECHNICAL FIELD

This disclosure pertains to wireless communication technology, in particular in a Radio Access Network (RAN), for example in the context of multi-antenna technology and/or MU-MIMO (Multi-User Multiple Input Multiple Output).

BACKGROUND

In modern wireless communication technology, beamforming is an increasingly important approach to provide efficient communication even in systems with a large number of devices communicating at the same time. For beamforming, a plurality of antenna elements (or radiators) in an antenna arrangement are used to provide a beam of radiation, e.g. in a desired angle or angular region, instead of (essentially) isotropically emitted radiation. With increasing number of antenna elements/radiators, beam forming becomes ever more useful, as the number of beams that can be provided or handled is related to the total number of available antennas/antenna elements, respectively to the total number of individually controllable antennas/antenna arrays. It should be noted that in many usage scenarios, the number of beams that can be provided simultaneously by one antenna arrangement, e.g. associated to a base station, will be lower than the number of nodes to be provided with beams.

With current approaches, the management of beams (beam management) in radio access networks may be inefficient, in particular in regard to interference between beams.

SUMMARY

It is an object of this disclosure to provide approaches facilitating improved beam management, in particular improved information signaling. The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution.

Accordingly, there is disclosed a method of operating an informing radio node in a radio access network. The method comprises transmitting beam reception information, the beam reception information being based on measurements performed on beams of a set of beams. The beam reception information indicates one or more beams of the set of beams to belong to a first subset of the set of beams, the first subset comprising weakly received beams.

Also, there is described an informing radio node for a radio access network, the informing radio node being adapted for transmitting beam reception information, the beam reception information being based on measurements performed on a set of beams. The beam reception information indicates one or more beams of the set of beams to belong to a first subset of the set of beams, the first subset comprising weakly received beams. The informing radio node may comprise, and/or be adapted for utilising, processing circuitry and/or radio circuitry, in particular a transceiver and/or transmitter and/or receiver, for such transmitting, and/or for performing the measurements and/or for receiving a corresponding configuration. Alternatively, or additionally, the informing radio node may comprise a corresponding transmitting module and/or corresponding measuring module and/or corresponding receiving module therefor.

An informing radio node may be a radio node as described herein, in particular a user equipment (UE) or terminal. However, in some implementation, the radio node may be a network node.

Generally, transmitting the beam reception information indicating the first subset may be dependent on the size of the first subset. For example, whether to transmit the beam reception information may be dependent on the number of beams in the first subset, in particular if beams are associated to the first subset based on whether their received strength reaches a threshold or not. A corresponding size threshold for the number of beams in the first subset may be configured or configurable or predefined. It may be considered that the beam reception information is transmitted if the size is below the size threshold. However, in some variants the information may be transmitted if the size reaches the size threshold or is larger than the size threshold.

A method of operating a configuring radio node in a radio access network may be considered. The method comprises configuring a second radio node for transmitting beam reception information, the beam reception information pertaining to a set of beams. The beam reception information indicates one or more beams of the set of beams to belong to a first subset of the set of beams, the first subset comprising weakly received beams.

Moreover, a configuring radio node for a radio access network is disclosed. The configuring radio node is adapted for configuring a second radio node for transmitting beam reception information. The beam reception information pertains to a set of beams, wherein the beam reception information indicates one or more beams of the set of beams to belong to a first subset of the set of beams, the first subset comprising weakly received beams. The configuring radio node may comprise, and/or be adapted for utilising, processing circuitry and/or radio circuitry, in particular a transceiver and/or transmitter, for such configuring. Alternatively, or additionally, the configuring radio node may comprise a corresponding configuring module therefor.

A configuring radio node may be a radio node as described herein, in particular a network node. However, in some implementations, the configuring radio node may be a user equipment or terminal. The second radio node may be an informing radio node as described herein.

Alternatively, or additionally, there may be considered method of operating a scheduling radio node in a radio access network. The method may comprise beam scheduling for transmission to a group of radio nodes based on beam reception information, wherein the beam reception information may be such as disclosed herein. Also, a scheduling radio node for a radio access network may be considered. The scheduling radio node may be adapted for beam scheduling for transmission to a group of radio nodes based on beam reception information, wherein the beam reception information may be such as disclosed herein. Beam scheduling may in particular be based on beam reception information received from one or more, in particular all, radio nodes in the group. The scheduling radio node may be a configuring radio node as described herein, and/or the method may comprise configuring as described herein. The group of radio nodes may comprise, and/or consist of, informing radio nodes as described herein. The group may comprise two or more radio nodes. Beam scheduling may comprise forming subgroups of radio nodes, to which beams may be scheduled together and/or simultaneously, e.g. within the same transmission time structure, e.g. slot or subframe. The scheduling radio node may comprise, and/or be adapted for utilising, processing circuitry and radio circuitry, in particular a transceiver and/or transmitter and/or receiver, for the beam scheduling, and/or for receiving the beam reception information, and/or for transmitting the beams. Alternatively, or additionally, the scheduling radio node may comprise a corresponding scheduling module and/or corresponding receiving module and/or corresponding transmitting module therefor. Transmitting the beams may be based on and/or according to the beam scheduling. Beam scheduling may comprise scheduling a first beam to a first informing radio node, which is not in the first subset of this node (e.g., because it is in the second subset and/or indicated as strongly received) simultaneously (e.g., in the same transmission timing structure and/or overlapping in time) with a second beam to a second informing radio node, wherein the second beam is in the first subset indicated by the first informing radio node. Such pairwise scheduling may be performed for several radio nodes of the group of radio nodes. However, beams may be scheduled in larger tupels than two based on the received beam reception information for each of the informing radio nodes.

Beam reception information may be considered to indicate the received strength of a beam as received by the informing radio node providing the information, wherein the strength may be represented for example by power and/or energy, and/or respective density/ies, and/or amplitude/s of received signaling. It may be considered that due to the directionality of beams, an estimate of the interference between beams can be made based on their respective received strengths for different informing nodes.

A beam may be indicated to belong to the first subset based on a reception strength and/or quality. A reception strength may represent or indicate for example a received power or energy. A reception quality may represent or indicate for example a signal to noise, to interference, or to interference and noise, ratio. Strength of a beam, in particular whether it is received weakly or strongly, may be based on received signal strength. It should be noted that a beam generally does not follow an ideal spatial distribution, and may be received even off-beam due to spillover and/or continuous drop-off, as its edges (in spatial distribution) may be smeared out. However, it still is useful to assume a beam structure containing a main part of the energy or power of the beam.

Transmission of a beam may comprise beamforming, which may be dependent on the numerology used. The numerology may be configured or configurable to the informing radio node.

Configuring a radio node for transmitting beam reception information may comprise transmitting control signaling indicating the configuration, for example physical layer control signaling like downlink or sidelink control signaling, in particular DCI or SCI, and/or higher layer signaling, e.g. RRC (Radio Resource Control) signaling or MAC (Medium Access Control) signaling.

The beams may be transmitted utilising different antenna arrangements. An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangements associated to a UE or terminal may be smaller (e.g., in size and/or number of antenna elements or arrays) than the antenna arrangement associated to a network node. Antenna elements of an antenna arrangement may be configurable for different arrays, e.g. to change the beam forming characteristics. In particular, antenna arrays may be formed by combining one or more independently or separately controllable antenna elements or subarrays. The beams may be provided by analog beamforming, or in some variants by digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) to convert digital control information into an analog antenna feed for the whole antenna arrangement (the ADC may be considered part of, and/or connected or connectable to, antenna circuitry). A scenario in which each antenna element is individually controllable may be referred to as digital beamforming, whereas a scenario in which larger arrays/subarrays are separately controllable may be considered an example of analog beamforming. Hybrid forms may be considered.

In some variants, the beam reception information may indicate one or more beams of the set to belong to a second subset of strongly received beams, which may comprise one or more beams.

It may be considered that the beams may be indicated to belong to the first subset and/or second subset based on a threshold.

In general, a weakly received beam may be considered weakly received in comparison to one or more other beams of the set, and/or in comparison to a (first) threshold, which may be predefined or configured or configurable. Analogously, a strongly received beam may be considered strongly received in comparison to one or more other beams of the set, and/or in comparison to a (second) threshold, which may be predefined or configured or configurable. The second threshold may be the same as the first threshold. However, in some variant, the threshold may be different, e.g. the second threshold may correspond to a stronger received beam than the first threshold. The first subset may comprise one or more beams. It may generally be considered that the first subset comprises one or more beams. The first subset may be smaller (e.g., contain a smaller number of beams) than the set of beams. The second subset may be smaller than the set of beams. The first subset and the second subset may have the same size, or have different sizes. The size of a subset may be configured or configurable. Beams of a set, or simultaneously scheduled beams, may be used in the context of MU-MIMO operation.

It may be considered that the beams are identified or identifiable by a beam identity indication, in particular, reference signaling and/or a signaling pattern. Reference signaling may for example be beam and/or receiver (e.g., UE) specific. Examples of reference signaling may comprise CSI-RS (Channel State Information Reference Signaling) or phase reference signaling or beam reference signaling. A signaling pattern may be a resource and/or modulation pattern, e.g. a time/frequency or code pattern.

The beam reception information may indicate N beams to belong to the first subset, and optionally M beams to belong to a second subset. N and M may be the same or different.

A beam of a set may be transmitted in specific resources, e.g. time/frequency resources. Beams of a set may be on the same resources, or on different resources, in particular at different times, or different frequency ranges. A beam may be beamformed, e.g. utilising an antenna arrangement like an array or several subarrays. Generally, a beam may be associated to, and/or configured for, an antenna port. Different beams may be associated to different antenna ports. A beam, in particular a beam scheduled by a scheduling radio node, may be a beam of a beam pair link, which may comprise the beam and a beam provided or formed by the receiving node (e.g., informing radio node), which may be a transmission beam (e.g., to enable two-directional communication) or a reception beam (formed to improve/focus reception of the incoming beam/scheduled beam. It should be noted that a beam of the set of beams on which measurements are performed by an informing radio node may be a scheduled beam, which may be scheduled based on earlier transmitted beams.

The set of beams may be configured, for example by a configuring radio node. Alternatively, or additionally, the measurements to be performed may be configured, e.g. by a configuring radio node.

A measurement may comprise power and/or energy and/or quality measurement, which may be specific to a beam, e.g. based on a beam identity indication. A measurement may comprise sampling received signaling (e.g., from one or more beams), and/or processing based on such sampling, e.g. to distinguish between different beams, in particular based on one or more a beam identify indication.

The beam reception information may be provided in a measurement report or in measurement reporting, and/or be based on one or more measurement reports. Such report or reporting may indicate the first subset and/or represent the beams in the first subset, and optionally the second subset.

Beam scheduling may generally comprise determining the time, e.g. the transmission timing structure/s, in which a beam is to be or is transmitted, for one or more beams. Optionally, scheduling may comprise determining frequency resources for a beam. Generally, beam scheduling may comprise selecting a beam (respectively, its form) from a set of beams for a receiver, e.g. informing radio node, for further transmission, e.g. based on beam reception information pertaining to earlier transmissions of the beams of the set.

A beam may generally be characterized by its spatial structure and/or geometry and/or direction. It may be considered that a beam is characterized by its a transmission angle (e.g., solid angle or spatial angle) and/or direction and/or beamwidth (in one or two dimensions), and/or phase and/or amplitude and/or gain (e.g., for controlling the associated antenna array), and/or antenna array or subarrays and/or spatial distribution of transmitted radiation (or for reception beams, radiation distribution selected for reception), and/or lobe arrangement (in space), and/or precoder and/or port. At different times (e.g., transmission timing structures), the same beam may carry different signaling, e.g. data signaling and/or reference signaling and/or control signaling with different content and/or with different combinations of such signalings. It should be noted that beams may be formed from a main lobe, or in some applications from a side lobe of a beamformed radiation patterns.

A radio node, e.g. a configuring radio node or scheduling radio node, may transmit beams of a set of beams, and may configure the set and/or associated measurements to one or more informing radio node/s. The informing radio nodes may indicate each a first subset of the set (it should be noted that the sets may be different or the same for different informing radio nodes), and/or a second subset.

Beam reception information relating to a subset of beams, or beam reception information in general, may be considered to indicate relative received power for the related beam, e.g. absolutely and/or relative to other beams of the set of beams. Beam reception information indicating the first subset may indicate one or more of the weakest received beams of the set of beams, e.g. in order, and/or those beams below a (first) threshold. Alternatively, or additionally, beam reception information may indicate a received power or energy, e.g. SSI and/or RSSI and/or RSRP and/or CRI (CSI-RS resource indicator), and/or channel quality, e.g. a ratio (e.g., SINR, SNR, SIR) and/or channel quality information like CQI or in general CSI (Channel State Information).

Beam reception information for the first subset may be configured for transmission at the same time and/or report and/or transmission timing structure as a beam reception information for a second subset, or differently. For example, beam reception information for a first subset may be configured for transmission less often than beam reception information for a second subset.

Moreover, a program product comprising instructions causing processing circuitry to control and/or perform a method as described herein is disclosed.

Also, there is discussed a carrier medium arrangement carrying and/or storing a program product as described herein.

The approaches described herein consider improved use of information in particular when beam forming, such that for example scheduling multiple beams with less interference may be achieved.

BRIEF DESCRIPTION OF THE DRAWINGS

The drawings are provided to illustrate concepts and approaches described herein, and are not intended to limit their scope. The drawings comprise.

DETAILED DESCRIPTION

In the following, there are discussed exemplary scenarios in which a network node like a gNB may operate as configuring and/or scheduling radio node, and one or more UEs may be considered informing radio nodes. Other scenarios may be considered.

The large variety of requirements for the next generation of mobile communications system (5G) implies that frequency bands at many different carrier frequencies will be needed. For example, low bands will be needed to achieve sufficient coverage and higher bands (e.g. mmW, i.e. near and above 30 GHz) will be needed to reach the required capacity. At high frequencies, the propagation properties are more challenging and beamforming both at the gNB (as an exemplary network node) and the UE might be required to reach sufficient link budget.

There may be considered different implementations of beamforming, both at the gNB and at the UE: analog beamforming, digital beamforming and hybrid beamforming. Each implementation has its advantages and disadvantages. Digital beamforming is the most flexible solution, but also the costliest due to the large number of required radios and baseband chains (and/or ADCs). Analog beamforming is the least flexible, but cheaper to manufacture due to reduced number of radio and baseband chains (radio and baseband chains may be considered radio and/or antenna circuitry).

Figure 1:
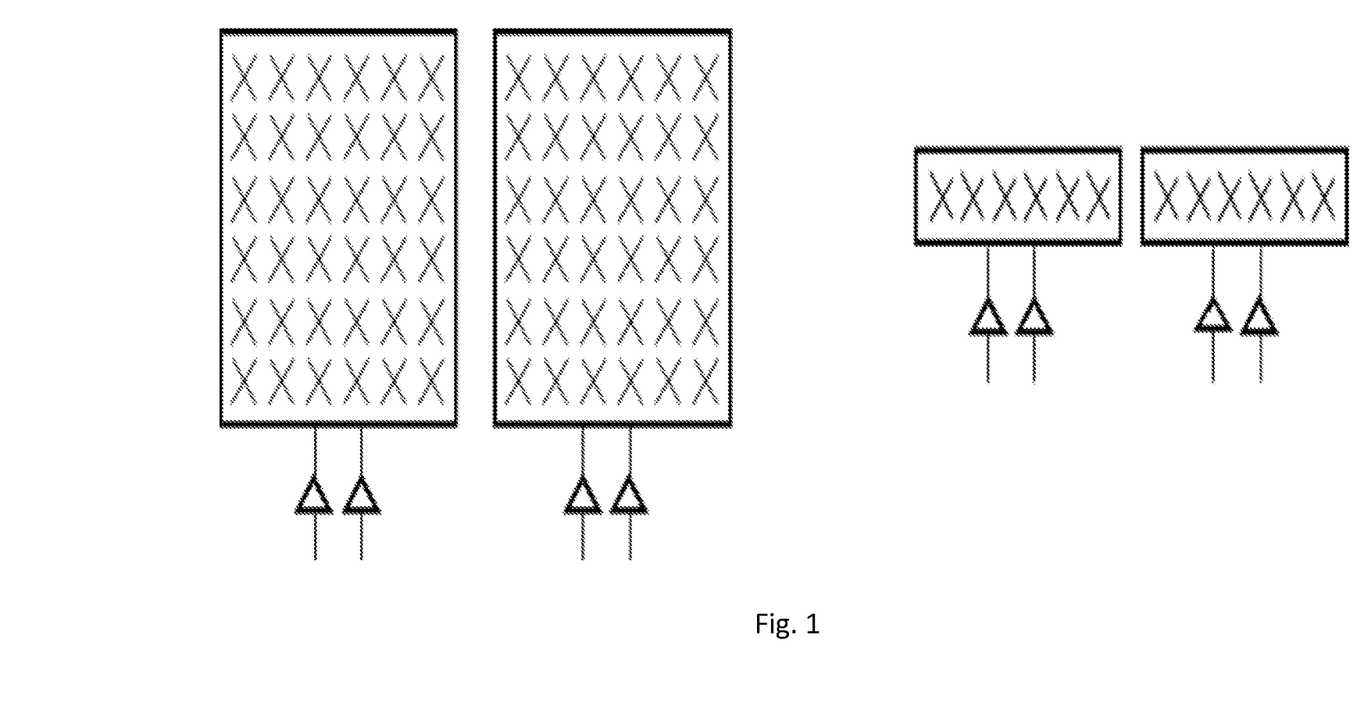
FIG. 1, showing exemplary antenna subarrays in the form of panels.

Hybrid beamforming is a compromise between analog and digital beamforming. One type of hybrid beamforming antenna architecture is an antenna panels. A panel is a rectangular antenna array of dual-polarized elements (radiators or antenna elements) which may comprise one transmit/receive unit (TXRU) per polarization, which may be independently controllable. An analog distribution network with phase shifters may be used to steer the beam of each panel. Multiple panels can be stacked next to each other and digital precoding can be performed across the panels. FIG. 1 illustrates two examples with two panels each (two-dimensional panels to the left and one-dimensional panels to the right), where each panel is connected to one TXRU per polarization.

Figure 2:
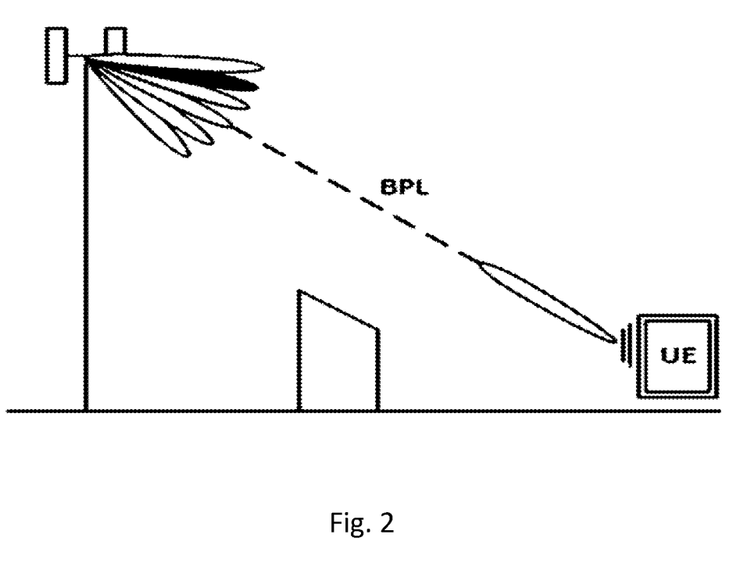
FIG. 2, showing a set of beams provided by a radio node, which may be measured by a UE.

In order to facilitate analog beamforming within a panel, a set of procedures referred to as beam management is currently being standardized by 3GPP. The purpose of beam management is to discover and maintain beam pair links (BPLs). In the example of FIG. 2, one BPL has been discovered and is being maintained by the network. A BPL (i.e both the gNB beam and UE beam) is expected to be discovered and monitored by the network using measurements on downlink reference signals used for beam management. Such reference signals may be considered reference signaling, in particular as a form of beam identify indication.

The gNB may configure the UE to measure on a set of beamformed CSI-RS transmitted by the gNB. The UE measures reference signal received power (RSRP) and indicates a preferred gNB TX beam by reporting a CSI-RS resource indicator (CRI) and/or its associated RSRP to the gNB. The UE may report the M best CRIs and RSRPs where M≥1, which may be considered elements of a second subset of strongly received beams. Furthermore, the CSI-RS transmission with a given gNB beam can be repeated to allow the UE to evaluate a suitable UE RX beam. SS blocks may be used for beam management, since these may be beamformed, and may be considered for use as beam identity indicators.

Multi-user MIMO (MU-MIMO) is foreseen to be a key technical component in 5G. The purpose of MU-MIMO is to serve multiple UEs simultaneously in the same time, frequency, and code resource, and thusly to increase the capacity of the system. If the gNB has multiple panels, it can perform MU-MIMO transmission by, e.g., transmitting to one UE from each panel or by applying different precoders across panels to different UEs.

To achieve significant capacity gains with MU-MIMO, it is important to ensure low interference between co-scheduled UEs (respectively beams for the UEs). This can be achieved by making accurate CSI (Channel State Information, as a form of beam reception information) available at the transmitter to facilitate interference nulling in the precoding, and/or by co-scheduling UEs that have close to orthogonal channels. An example of the latter is if two UEs are in line-of-sight and have an angular separation larger than the beamwidth of a panel. In this case, the two UEs can be co-scheduled by transmitting with a beam directed to the first UE from one panel and transmitting with a beam directed to the second UE from another panel. It should be noted that analogous approaches may be used for a UE transmitting beams, e.g. on different sidelink connections or when communicating with different network nodes, depending on its antenna arrangement.

When using MU-MIMO in combination with beam management for antenna panels, CRI and RSRP reports of the M best gNB TX beams give information only about how to select the gNB TX beam for a single UE at a time. It does not give any information on how much interference a gNB TX beam selected for one UE will generate towards a co-scheduled UE during MU-MIMO transmission. Therefore, it will be difficult for the gNB to take good co-scheduling decisions for MU-MIMO based on only this information.

It may be considered that the UE, e.g. due to being configured accordingly, should also report the N, where N≥1, CRIs with lowest RSRP to the gNB to indicate a subset of weakly received beams. Optionally, it may also report the corresponding RSRP values. This will provide useful information to the gNB for making co-scheduling decisions in MU-MIMO transmission.

The approaches described herein provide increased capacity thanks to reduced inter-user interference in MU-MIMO transmission. This is facilitated by providing more information to the gNB for making co-scheduling decisions.

There may be considered configuring, e.g. with a configuration message from the gNB, that a UE should also report the N CRIs with lowest RSRP to the gNB, where N≥1. Accordingly, a subset of weakly received beams (in this case, the weakest received beams) is indicated. Alternatively, or additionally, it may be configured to report CRIs that have received signal strength, e.g. represented by RSRP, that is below a threshold, where the threshold may be determined by the network or the UE, and/or be configured or configurable or predefined. Optionally, the P lowest RSRP values may also be reported, where P≤N. The beam reception information thus in these examples may be represented by CRI and/or RSRP, which may be transmitted in a measurement report.

In one variant, the configuration message may comprise or configure a configuration of a CSI Report Setting via RRC. The CSI Reporting Setting may then be dynamically triggered in a DCI for an aperiodic CSI report, or, it may be periodically configured via RRC.

Figure 3:
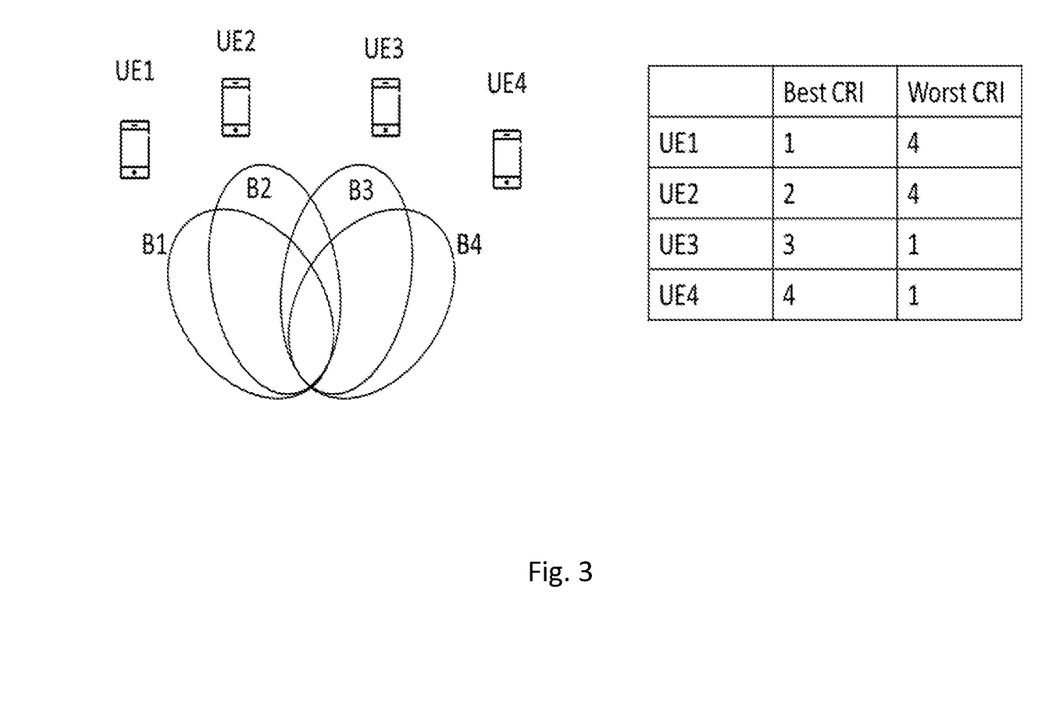
FIG. 3, showing an exemplary set of beams and UEs arranged at different positions, as well as exemplary beam reception information provided by the UEs for the set of beams.

The proposed reports are valuable to the gNB in particular for user pairing in MU-MIMO scheduling. A very simple example is illustrated in FIG. 3. It may be assumed that there are four UEs, UE1, . . . , UE4, and the gNB wants to co-schedule two UEs for MU-MIMO transmission. Further, the gNB has four TX beams (forming a set of beams) denoted by B1, . . . , B4 in the figure with corresponding CRIs: CRI1, . . . , CRI4.

The table shows the best and worst reported CRI for each UE, where best means highest CSI-RSRP indicating strongest received strength and worst means lowest CSI-RSRP indicating weakest received strength. It should be noted that not all UEs may necessarily receive or be able to detect all beams.

If a beam is configured for measurements, but cannot be measured, it may generally be considered to have negligible or zero received strength. If the UEs report only the best beam(s), the gNB has no knowledge about how much inter-user interference different co-scheduling hypotheses will lead to. For example, the gNB might co-schedule UE1 and UE2 and transmit with beams B1 and B2. However, B2 will generate high interference towards UE1 and vice versa. By also taking into account the worst reported beams, the gNB can instead co-schedule UE1 and UE4 since UE4 will receive only weak interference from beam B1, and vice versa, according to the proposed reporting. If the UEs have also reported corresponding RSRP values, the gNB can estimate the amount of inter-user interference and decide if this is acceptable for MU-MIMO transmission. Co-scheduling may be considered to indicate simultaneous transmission, and/or transmission in the same transmission timing structure.

In more general terms, the gNB can use the proposed reporting to prioritize co-scheduling hypotheses for which the CRI for one of the UEs is in the set of "bad" CRIs of the other UEs, etc. "Bad" CRI here may for example indicate either that it is in the set (which is a subset of the set of beams) of N CRIs with lowest CSI-RSRP or in a set of CRIs that have an CSI-RSRP value below a threshold.

In some variants, a threshold may be relative to, and/or based on, a signal strength that is the strongest received. For example, a RSRP threshold may be relative to the RSRP to the best reported/received beam, such that if the best beam has an RSRP of x dB and the threshold is y dB, then the UE shall report all beams with an RSRP 475 less than x-y dB. In further variants, the number of CRIs that fall below the threshold, e.g. the RSRP threshold, may be independently encoded.

As the weaker directions of the channel are expected to change on a slower basis, the reporting of the beams with weakest received strength (beams indicated to belong to the first subset), e.g. with lowest RSRPs, in some variants may be triggered with a lower periodicity than the reports of the CRIs received strongest/with highest RSRP, and/or the first subset and the second subset may be reported independently from each other, e.g. in different messages and/or at different times or periodicities.

In another variant, only the number of CRIs with an RSRP that is below the threshold relative the preferred CRI is fed back in a first CSI report. This information may give an indication to the gNB if it is likely that MU-MIMO scheduling will be beneficial. For instance, if the number of "weak" CRIs reported by a UE is larger, it is probable that an MU-MIMO co-scheduling with an arbitrary beam will result in low interference. However, if the reported number of "weak" CRIs is small, the opposite is probable. Thus, in some implementations, the gNB may choose to trigger a report of the "weakest" M CRIs in a second CSI report only if the reported number of weak CRIs (in the first report) is small in order to conserve UL overhead.

There may be considered configuring, e.g. with a configuration message from the gNB, to a UE that it shall report the N, where N≥1, CRIs with lowest RSRP in a gNB TX beam sweep. Optionally, the UE should also report corresponding CSI-RSRP values. Alternatively, the UE should report CRIs that have an RSRP value that is below a threshold.

Alternatively, or additionally, it may be considered that a number of CRIs with an RSRP that is below the threshold relative the preferred CRI is reported in a CSI report if the said number is larger than a pre-configured number M, otherwise, the CRIs themselves are reported. A CSI report may be seen as an example indicating beam reception information, in particular as a measurement report respectively control signaling.

Figure 4:
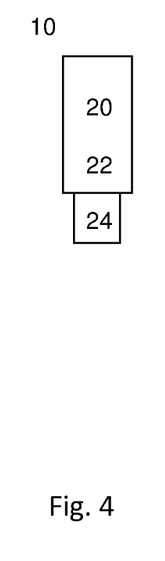
FIG. 4, showing an exemplary radio node implemented as user equipment or terminal.

FIG. 4 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals.

Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 5:
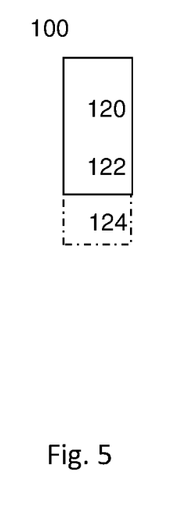
FIG. 5, showing an exemplary radio node implemented as network node, like a gNB or eNB.

FIG. 5 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein;

in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM). Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary.

Transmitting in downlink may pertain to transmission from the network or network node to the terminal. Transmitting in uplink may pertain to transmission from the terminal to the network or network node. Transmitting in sidelink may pertain to (direct) transmission from on terminal to another. Uplink, downlink and sidelink (e.g., sidelink transmission and reception) may be considered communication directions.

Signaling may generally comprise one or more signals and/or one or more symbols. Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/ allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of uplink control information, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Transmitting a beam may comprise transmitting signaling, in particular control signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. A beam may indicate the spatial and/or angular distribution of signaling or a transmission utilising the beam.

Transmitted beam reception information, and/or a signaling for configuring a node, may be considered forms of control signaling. Beam reception information transmitted by a UE or terminal may for example be considered measurement reporting and/or uplink control information, in particular UCI.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol for transmitting or an ending symbol for receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data.

Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink signaling, in particular acknowledgement signaling, and/or configuring resources and/or a resource pool therefor.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of or associated to a symbol. Accordingly, different symbols may have different symbol time lengths.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A mini-slot may be transmitted and/or received based on a configuration.

A configuration, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission and/or mini-slot or beam may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation.

A configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

It may be considered that the scheduled transmission represents transmission on a physical channel, in particular a shared physical channel, for example a physical uplink shared channel or physical downlink shared channel. For such channels, semi-persistent configuring may be particularly suitable.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling a beam may comprise scheduling the beam for one or more receivers, e.g. UEs, which may be in locations covered by the same beam. Scheduling a beam may consider beam switching, and/or a beam may be characterized by a switching pattern, e.g. in time and/or space. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g.,in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component.

A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise:
CSI-RS Channel State Information Reference Signaling
LTE Long Term Evolution, a telecommunication standard
NR New Radio, a telecommunication standard
SSI Signal Strength Indicator/Information
RSSI Received Signal Strength Indicator/Information
RSRP Reference Signal(ing) Received Power
RSRQ Reference Signal(ing) Received Quality
SINR Signal-to-Interference-and-Noise Ratio
SIR Signal-to-Interference Ratio
SNR Signal-to-Noise Ratio
CQI Channel Quality Information
DCI Downlink Control Information
OFDM Orthogonal Frequency Division Multiplex
RRC Radio Resource Control
UCI Uplink Control Information
UE User Equipment These abbreviations may be interpreted according to 3GPP ($3^{rd}$ Generation Partnership Project, a standardisation organisation).

The invention claimed is:

1. A method of operating an informing radio node in a radio access network, the method comprising:
transmitting beam reception information, the beam reception information being based on measurements performed on beams of a set of beams, wherein the beam reception information indicates one or more beams of the set of beams to belong to a first subset of the set of beams, the first subset comprising weakly received beams, wherein the transmitting of the beam reception information is transmitted responsive to a number of beams in the first subset being below a threshold number; and
for each of the one or more beams in the first subset, transmitting measurements that resulted in the one or more beams being placed in the first subset and identify which beam of the one or more beams is associated with the measurements.

2. A method according to claim 1, wherein a beam is indicated to belong to the first subset based on a reception strength and/or quality.

3. A method according to claim 1, wherein the beams of the set of beams are transmitted utilising different antenna arrangements.

4. A method according to claim 1, wherein the beam reception information indicates one or more beams of the set to belong to a second subset of strongly received beams, which may comprise one or more beams.

5. A method according to claim 4, wherein the beams of the set of beams are indicated to belong to the first subset and/or the second subset based on a threshold.

6. A method according to claim 1, wherein the beams of the set of beams are identified or identifiable by a beam identity indication, in particular, reference signaling and/or a signaling pattern.

7. A method according to claim 1, wherein the beam reception information indicates N beams to belong to the first subset, and M beams to belong to a second subset.

8. A method according to claim 1, wherein the set of beams is configured.

9. A method according to claim 1, wherein the beam reception information is provided in a measurement report.

10. An informing radio node for a radio access network, the informing radio node comprising:
processing circuitry, wherein the processing circuitry is adapted to,
transmit beam reception information, the beam reception information being based on measurements performed on a set of beams, wherein the beam reception information indicates one or more beams of the set of beams to belong to a first subset of the set of beams, the first subset comprising weakly received beams, wherein the transmitting of the beam reception information is transmitted responsive to a number of beams in the first subset being below a threshold number; and
for each of the one or more beams in the first subset, transmit measurements that resulted in the one or more beams being placed in the first subset and identify which beam of the one or more beams is associated with the measurements.

11. A method of operating a configuring radio node in a radio access network, the method comprising:
configuring a second radio node to transmit beam reception information responsive to a number of beams belonging to a first subset of a set of beams being below a first threshold, the beam reception information pertaining to a set of beams, wherein the beam reception information indicates one or more beams of the set of beams to belong to a first subset of the set of beams, the first subset comprising weakly received beams; and
configuring the second radio node to, for each of the one or more beams in the first subset, transmit measurements that resulted in the one or more beams being placed in the first subset and identify which beam of the one or more beams is associated with the measurements.

12. A method according to claim 11, wherein a beam is indicated to belong to the first subset based on a reception strength and/or quality.

13. A method according to claim 11, wherein the beams of the set of beams are transmitted utilising different antenna arrangements.

14. A method according to claim 11, wherein the beam reception information indicates one or more beams of the set to belong to a second subset of strongly received beams, which may comprise one or more beams.

15. A method according to claim 14, wherein the beams of the set of beams are indicated to belong to the first subset and/or the second subset based on a threshold.

16. A method according to claim 11, wherein the beams of the set of beams are identified or identifiable by a beam identity indication, in particular, reference signaling and/or a signaling pattern.

17. A method according to claim 11, wherein the beam reception information indicates N beams to belong to the first subset, and M beams to belong to a second subset.

18. A method according to claim 11, wherein the set of beams is configured.

19. A method according to claim 11, wherein the beam reception information is provided in a measurement report.

20. A method according to claim 11, further comprising: co-scheduling the second node and at least one more node for multiple user-multiple input multiple output, MU-MIMO, transmission based on the one or more beams in the first subset.

21. A configuring radio node for a radio access network, the configuring radio node being adapted for comprising:
processing circuitry, wherein the processing circuitry is adapted to,
configure a second radio node to transmit beam reception information responsive to a number of beams belonging to a first subset of a set of beams being below a first threshold, the beam reception information pertaining to the set of beams, wherein the beam reception information indicates one or more beams of the set of beams to belong to the first subset of the set of beams, the first subset comprising weakly received beams; and
configure the second radio node to, for each of the one or more beams in the first subset, transmit measurements that resulted in the one or more beams being placed in the first subset and identify which beam of the one or more beams is associated with the measurements.

* * * * *